(12) United States Patent
Menditto et al.

(10) Patent No.: US 7,401,146 B1
(45) Date of Patent: Jul. 15, 2008

(54) METHOD AND APPARATUS FOR TRACKING RELATED INFORMATION IN A NETWORK

(75) Inventors: Louis F Menditto, Raleigh, NC (US); Barron C Housel, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 883 days.

(21) Appl. No.: 09/861,818

(22) Filed: May 21, 2001

(51) Int. Cl.
 *G06F 13/00* (2006.01)
(52) U.S. Cl. ...................................... 709/227
(58) Field of Classification Search ................. 370/390; 707/10, 102, 201; 717/102; 709/245, 224, 709/206–207, 227–229, 203; 713/155; 726/1; 704/219; 714/48
See application file for complete search history.

(56) References Cited

U.S. PATENT DOCUMENTS

| | | | | |
|---|---|---|---|---|
| 5,487,100 A * | 1/1996 | Kane | .......................... | 340/7.23 |
| 5,905,736 A | 5/1999 | Ronen et al. | ................. | 370/546 |
| 5,956,391 A | 9/1999 | Melen et al. | ................. | 379/114 |
| 5,958,053 A * | 9/1999 | Denker | ........................... | 726/1 |
| 5,970,477 A | 10/1999 | Roden | ......................... | 705/32 |
| 5,974,416 A * | 10/1999 | Anand et al. | ................... | 707/10 |
| 6,047,051 A | 4/2000 | Ginzboorg et al. | .......... | 379/130 |
| 6,189,096 B1 * | 2/2001 | Haverty | ....................... | 713/155 |
| 6,230,012 B1 | 5/2001 | Willkie et al. | ............... | 455/435 |
| 6,502,102 B1 * | 12/2002 | Haswell et al. | ............. | 707/102 |
| 6,578,078 B1 * | 6/2003 | Smith et al. | ................. | 709/224 |
| 6,601,233 B1 * | 7/2003 | Underwood | ................ | 717/102 |
| 6,629,149 B1 * | 9/2003 | Fraser et al. | ................. | 709/245 |
| 6,687,732 B1 * | 2/2004 | Bector et al. | ................. | 709/200 |
| 6,745,360 B1 * | 6/2004 | Srinivas et al. | .............. | 714/748 |
| 6,754,621 B1 * | 6/2004 | Cunningham et al. | ....... | 704/219 |
| 6,757,696 B2 * | 6/2004 | Multer et al. | ................ | 707/201 |
| 6,771,644 B1 * | 8/2004 | Brassil et al. | ............... | 370/390 |
| 2002/0059114 A1 | 5/2002 | Cockrill et al. | ............... | 705/27 |

FOREIGN PATENT DOCUMENTS

| | | |
|---|---|---|
| WO | WO 98/26381 | 12/1997 |
| WO | WO 99/31610 | 12/1998 |

OTHER PUBLICATIONS

Jepsen, T. Soap cleans up interoperability problems on the Web, Jan.-Feb. 2001, IEEE, IT Professional, vol. 3, Issue 1, pp. 52-55.*

* cited by examiner

*Primary Examiner*—Robert B. Harrell
(74) *Attorney, Agent, or Firm*—Baker Botts L.L.P.

(57) ABSTRACT

An apparatus includes a network system and a message. The network system includes a client terminal and a receiver. The client terminal includes a browser, an identifier, and a positioner. The positioner inserts the identifier into the message. The message is transmitted from the client terminal through an internet service provider and through a plurality of firewalls and is received by the receiver. The receiver includes a component that recognizes the identifier within the message and directs the message to one of a plurality of servers. The component also recognizes a subsequent message related to the identifier and directs the subsequent message to the one of the plurality of servers. The one of the plurality of servers then directs each of the messages to a service provider for processing. A related response is generated by the service provider and returned through the network system and to the client terminal.

18 Claims, 2 Drawing Sheets

METHOD AND APPARATUS FOR TRACKING RELATED INFORMATION IN A NETWORK

TECHNICAL FIELD OF THE INVENTION

This invention relates in general to network communication and, more particularly, to a method and apparatus for tracking related information in a network.

BACKGROUND OF THE INVENTION

Electronic commerce has become increasingly popular in today's society. Electronic commerce provides the ability to conduct business over a network and includes services and products that are available to the consumer online. An important element in conducting business online is the ability of a network to group or direct information that relates to the same transaction. This grouping of information allows data that is sent at different times to be aggregated into a single transaction before it is processed. For example, in the case of services that are available online, this grouping of information allows cumulative data that is input by a consumer to be collected at a single point before being processed. In the case of products being sold online, this grouping of information would allow items selected by a consumer to be aggregated into a single account before purchasing all of the items in the lot. Because speed and efficiency are tantamount in network communications, it is important for this grouping function to be performed without hindering the traffic flow within the network.

Some business service providers and online merchants have addressed this grouping function by "stickying" pieces of information that are interrelated so that all information relating to a single transaction is directed to one location for processing. "Stickying" generally refers to a process for recognizing and categorizing related pieces of information. The "stickying" of information is generally assisted by the use of a cookie which writes some identification script back to a user's memory or hard drive. The cookie remains as an identification tool for the transaction until the transaction is complete. It is this conventional stickying technique that has been generally adequate for its intended purpose but not satisfactory in all respects. In this regard, existing "stickying" processes tend to have one or more of several disadvantages.

One problem with "stickying" processes, which use a cookie, is that the cookie is injected as an identification tool only after a request sent by a user to a component in the network. Because the cookie is not within the message before it is initially transmitted, software must be developed and implemented to generate and insert the cookie into the message while it is being processed. This complex software results in a substantial delay in the processing of the message. In addition, if the software faults in inserting the cookie or inserts an inaccurate identifier, the message and related information will not reach their intended destination.

Another problem with "stickying" processes is that they require some component in the network, generally a load balancer, to proxy or maintain a connection while identification information from the request is recognized. This recognition causes a delay in processing and increases the burden on the load balancer because the load balancer is not simply directing the request. Instead, the load balancer is forced to suspend direction of the request until the desired identification information is extracted from the message.

Yet another problem with existing "stickying" processes is that many users prefer not to use them. An increasing number of business service providers and online merchants currently provide the option to a user to decline the use of the cookie element. If the cookie is refused, network components are unable to identify information relating to the same transaction and thus cannot direct interrelated information properly. With the cookie element absent, information in the network is sent to random destinations.

Still another problem with existing "stickying" processes is that they are unreliable. As a request proceeds through the network, the additional identification tool can often be changed, lost, or deleted over the life of the transaction. If the identification tool is inaccurate or missing, the request and the information related to the request is simply directed to random locations. These random locations each receive a piece of information that relates to the transaction, but the related information is not processed at a single site. Overcoming this problem generally requires large amounts of processing power to be added to a load balancer. This addition to the load balancer is undesired because it increases the complexity and cost of directing information within the network.

SUMMARY OF THE INVENTION

From the foregoing, it may be appreciated that a need has arisen for a network that can track and group related pieces of information. In accordance with the present invention, a method and an apparatus for tracking related information in a network is provided that substantially eliminates or greatly reduces disadvantages and problems associated with conventional information tracking techniques.

According to one embodiment of the present invention, a method is provided to address this need and involves inserting an identifier into a computer-generated message within a network which is operable to facilitate communication of the message. The message is sent over the network and received at a receiver that includes a component operable to recognize the identifier. The receiver is operable to direct the message to a location, and the receiver and the component cooperate to direct data related to the identifier to the location.

The present invention provides various technical advantages over conventional information tracking techniques. For example, one technical advantage is that injection of the identifier occurs before the message is transmitted through the network. This injection, early in the processing of the message, enhances speed and efficiency because it eliminates the need for software to insert an identifier after the message has begun processing.

Another advantage of the present invention is that the software provided in the receiver allows a message within a network to be directed immediately after it is received by a load balancer. The software implemented by the present invention quickly recognizes the identifier at the load balancer and transmits the message unaltered to its next destination. The ability of the load balancer to immediately recognize the identifier eliminates the need to proxy the connection and extract information from the content and therefore saves considerable time in transmitting information within the network.

Yet another advantage of the present invention is that user approval is not necessary in order to identify a message generated by a user. Because the identifier is simply a unique element that distinguishes the user's terminal, any type of prior approval by a user is not required.

Still another technical advantage of the present invention is reliability. The identifier is inserted into the message before it is launched into the network. The identifier remains within the message and unchanged throughout the life of the transaction that relates to the message. This message with the identifier can therefore be accurately directed to its proper destination. Other technical advantages may be readily ascertainable by those skilled in the art from the following figures, description, and claims.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
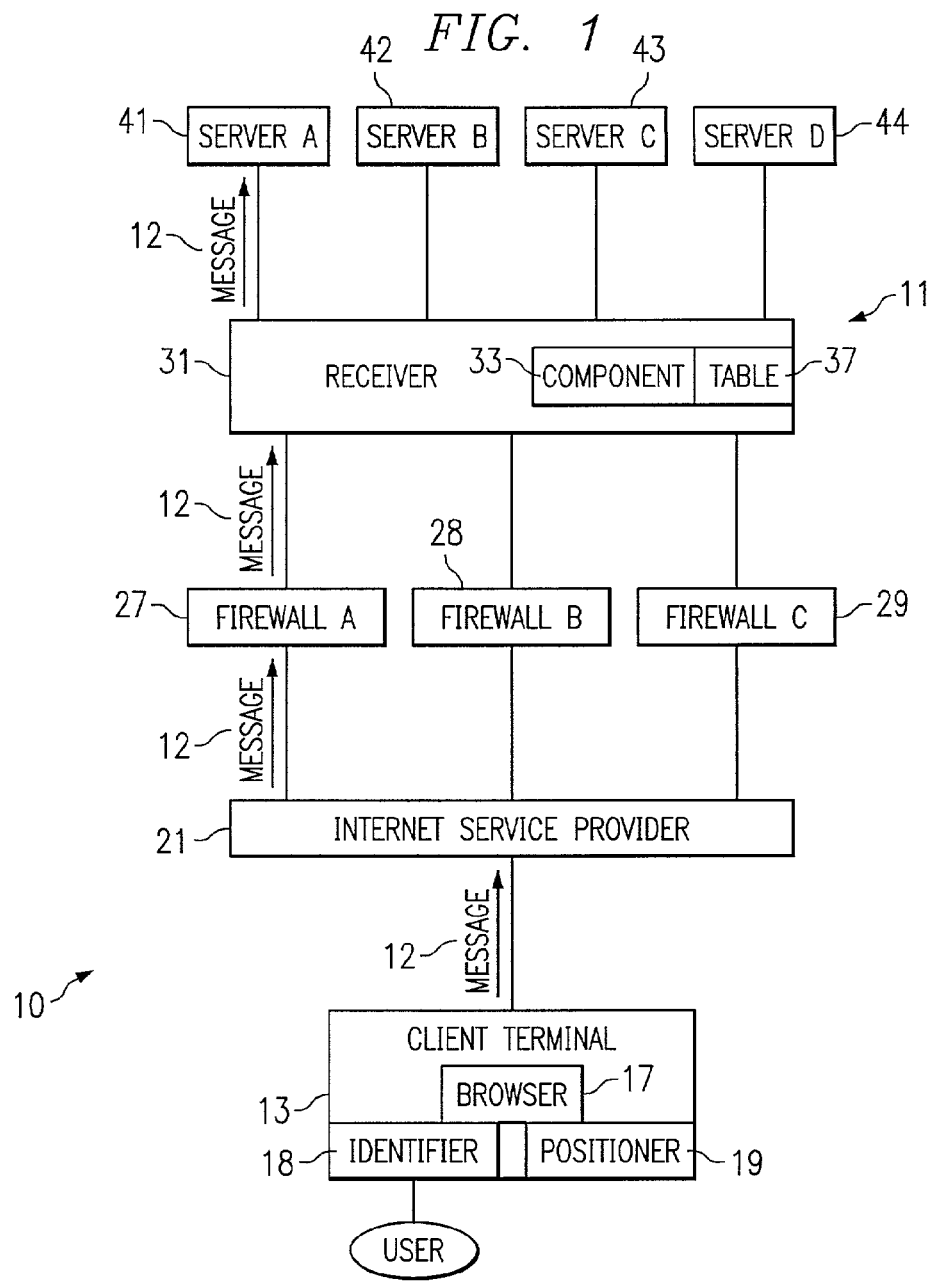
FIG. 1 is a block diagram illustrating a tracking system for tracking a message as it flows through a network, in accordance with one embodiment of the invention.

FIG. 1 is a block diagram illustrating a tracking system 10 that includes a network 11 and an initial message 12 that is transmitted through network 11. Network 11 facilitates communication of message 12 through tracking system 10. Message 12 is a computer-generated object that requests information from network 11. Additional details relating to the infrastructure of message 12 will be discussed later with reference to FIG. 2. Message 12 is generated by a client terminal 13 and based on user keystrokes input at client terminal 13.

Client terminal 13 includes a central processing unit (CPU) and a monitor. The user of client terminal 13 inputs keystrokes that generate message 12. Client terminal 13 also includes a browser 17, an identifier 18, and a positioner 19.

Client browser 17 is software that sends message 12 requesting information from network 11. Client browser 17 communicates with identifier 18 and positioner 19.

Identifier 18 is a globally unique identifier (GUID) having a 16-byte sequence. The GUID is a conventional identifier commonly known to those having ordinary skill in the art. Identifier 18 denotes a unique label for a user of client terminal 13. Identifier 18, once inserted into message 12, remains as an identification tool while message 12 flows through network 11. Identifier 18 remains intact and unchanged throughout the life of any transaction, within network 11, relating to message 12. Alternatively, identifier 18 could be any element that identifies the user of client terminal 13, such as key functions relating to a user's social security number, birth date, credit card number, etc. Identifier 18 is inserted into message 12 by positioner 19.

Positioner 19 includes software that can communicate with identifier 18 and browser 17. Positioner 19 detects identifier 18 when client terminal 13 is initiated, or may alternatively detect identifier 18 at any time during processing or transmission of message 12. Positioner 19 inserts identifier 18 into message 12 at client terminal 13 before it is sent through network 11. Positioner 19 inserts identifier 18 into message 12 without modifying or altering identifier 18. Alternatively, positioner 19 could be any component, device, or software capable of inserting identifier 18 into message 12. Once identifier 18 has been inserted into message 12, client terminal 13 transmits message 12 to an Internet Service Provider (ISP) 21 as shown by an arrow in FIG. 1.

ISP 21 is a conventional commercial provider of internet service, such providers include America On-Line (AOL), Mindspring, Microsoft Network (MSN) etc. ISP 21 receives message 12 with identifier 18 that is communicated by client browser 17. As shown by an arrow in FIG. 1, message 12 is transmitted from ISP 21 to any one of a series of firewalls.

Firewall A 27, Firewall B 28, and Firewall C 29 are all firewalls of a conventional type commonly known to one having ordinary skill in the art. Firewalls 27, 28, and 29 are security components that limit access to information residing beyond the firewall structure. Message 12 is randomly sent by ISP 21 to any one of the series of firewalls 27, 28, and 29. Each of firewalls 27, 28, and 29 act as a buffer and transmit message 12 to its next destination unaltered. As illustrated in FIGURE 1, message 12 is received by Firewall A 27, which then transmits message 12 to a receiver 31.

Receiver 31 is a load balancer that includes a component 33 and a table 37. Receiver 31 essentially selects which server will receive message 12. Receiver 31 does not alter message 12 in any way before transmitting message 12 to its next destination. Receiver 31 communicates with component 33 and table 37.

Component 33, included in receiver 31, is software that recognizes identifier 18 that is inserted by positioner 19. As shown in FIG. 1, component 33 communicates with table 37. Table 37 stores identifier 18 and subsequent identifiers that pass through tracking system 10 of network 11. Table 37 also stores the server destination of message 12. Component 33 checks table 37 to determine if there is a match between previous identifiers stored in table 37 and any subsequent data relating to those previous messages. A subsequent message may then be generated by a user of client terminal 13 in the example embodiment of FIG. 1. The subsequent message may be any data or information relating to message 12 that flows through network 11. The subsequent message includes a copy of identifier 18 that is inserted by positioner 19 at client terminal 13. When initial message 12 is sent through network 11 for the first time, component 33 recognizes identifier 18 within message 12 and records it in table 37. Once identifier 18 is stored in table 37, it can later be referenced by component 33 via table 37 to assist receiver 31 in directing the subsequent message. By using the stored identifier in table 37, components 33 can direct the subsequent message to the same server that initially received message 12. Receiver 31 may direct message 12 to any one of a series of servers 41, 42, 43, and 44. As illustrated by an arrow in FIG. 1, receiver 31 directs message 12 to server A 41. Additionally, receiver 31 may transmit the subsequent message relating to message 12 to server A 41, which is the same server that initially received message 12.

Server A 41, server B 42, server C 43, and server D 44 are of a conventional type commonly used in the networking industry. Servers 41, 42, 43, and 44 communicate with receiver 31 and selectively direct incoming information to its next destination.

Figure 2:
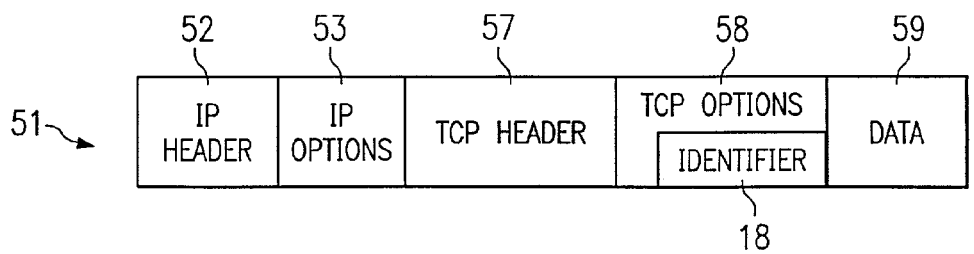
FIG. 2 is a block diagram of a synchronize packet included within the message that flows through the tracking system of FIG. 1.

Referring now to FIG. 2, FIG. 2 is a block diagram of a synchronize (SYN) packet 51 included within message 12 that flows through tracking system 10 of FIG. 1. Message 12 is broken down into a series of packets as it flows through network 11. SYN packet 51 represents a part of message 12 that is sent through network 11 first. SYN packet 51 includes an internet protocol (IP) header 52, an IP options section 53, a transmission control protocol (TCP) header 57, a TCP options section 58, and a data section 59. IP header 52 is a 20-byte sequence that indicates the source and destination of message 12. IP options section 53 is a computer-readable portion that includes configurable elements such as security options, compartmental restrictions, and handling restrictions. TCP header 57 indicates the port destination for message 12. TCP options section 58 includes configurable elements of the TCP including modifications in port destination and port compatibility. Preferably, TCP options section 58 also includes identifier 18. Identifier 18 is inserted into TCP options 58 by positioner 19 before message 12 is sent from client terminal 13. Alternatively, identifier 18 could be inserted into any element that is within SYN packet 51 or any other packet relating to message 12. Once identifier 18 is inserted into SYN packet 51 of message 12, it remains with SYN packet 51 for the life of the transaction within network 11.

A description will now be provided of the operation of tracking system 10 of FIG. 1. As shown in FIG. 1, a user generates initial message 12 by inputting keystrokes into client terminal 13. Positioner 19 inserts a copy of identifier 18 into message 12, which then flows to client browser 17 of client terminal 13. Identifier 18 may be inserted into message 12 when client terminal 13 is initially activated or at any other time prior to sending message 12 to ISP 21. After identifier 18 is inserted into message 12, client terminal 13 transmits message 12 to ISP 21.

ISP 21 transmits message 12 unchanged to any one of a series of firewalls. As illustrated by an arrow in FIG. 1, message 12 is sent to Firewall A 27. Firewall A 27 does not alter or modify message 12. This free flow of message 12 through Firewall A 27 stands in contrast to modern routing systems. Modern routing systems can filter out or strip an identification tool, such as a cookie, as it passes through a firewall component. Firewall A 27 however, may transmit message 12 to receiver 31 without disturbing the integrity of identifier 18. Component 33, which is contained within receiver 31, analyzes message 12 and recognizes identifier 18 within message 12. Component 33 then records identifier 18 in table 37. Receiver 31 then transmits message 12 to any one of a series of servers.

Turning now to the subsequent message as it flows through network 11, the subsequent message is generated by a user inputting keystrokes at client terminal 13. Positioner 19 inserts a copy of identifier 18 into the subsequent message before it is sent by client browser 17 to ISP 21. With a copy of identifier 18 in place, the subsequent message is transmitted by client browser 17 to ISP 21. ISP 21 then transmits the subsequent message to Firewall A 27. Firewall A 27 then transmits the subsequent message unchanged and unmodified to receiver 31. Component 33 recognizes identifier 18 within the subsequent message and compares it to previously recorded identifiers listed in table 37. If component 33 finds a match between identifier 18, carried by the subsequent message, and a previous identifier stored in table 37, then receiver 31 transmits the subsequent message to the same server that processed any previous message having an identifier that relates to the identifier carried by the subsequent message. Thus the subsequent message, which shares the same identifier as message 12, is sent to the same server that initially received messages 12. This tracking and identification process can be explained further with reference to FIG. 3.

Figure 3:
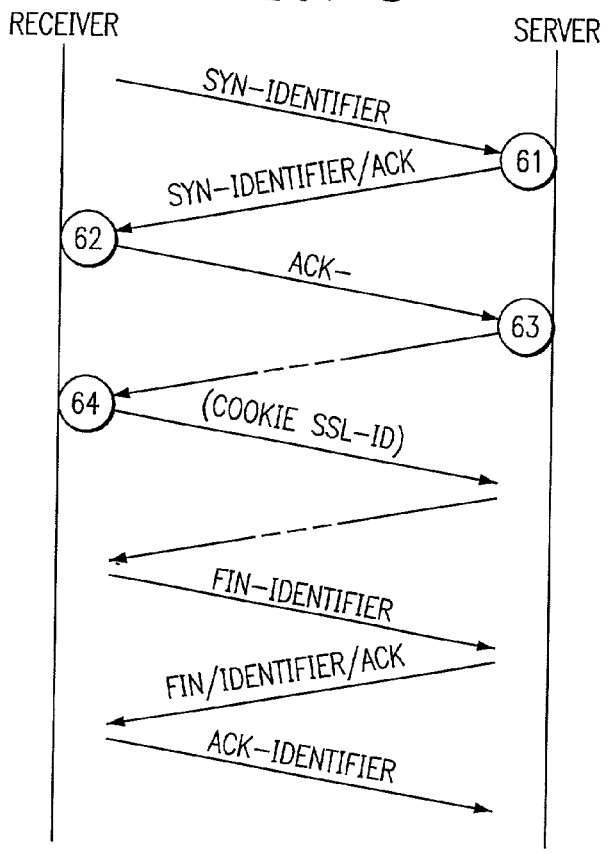
FIG. 3 is a diagrammatic flowchart illustrating a series of steps for transmitting the synchronize packet of FIG. 2.

FIG. 3 is a diagrammatic flow chart illustrating a series of steps for transmitting SYN packet 51 from receiver 31 to one of a series of servers. As a first step, receiver 31 receives initial message 12 or the subsequent message and cooperates with component 33 to recognize identifier 18. As shown by an arrow in FIG. 3, this recognition of identifier 18 within message 12 is done in first step 61. From step 61 SYN packet 51, which carries identifier 18, is then acknowledged at step 62. The acknowledgment of receipt of SYN packet 51 is completed at step 63. SYN packet 51 then moves through conventional processing steps and is received by server A 41 as illustrated in FIGS. 1 and 3.

By way of comparison, FIG. 3 also illustrates a conventional cookie stickying process. At step 64 in a conventional stickying process, the cookie, shown in parenthesis, is inserted into a message in conjunction with a secure sockets layer identification (SSL-ID). As shown in FIG. 3, cookie stickying techniques recognize an identification tag at step 64, the fourth layer of processing. In contrast, the example embodiment of the present invention as illustrated in FIG. 3, allows receiver 31 to immediately recognize identifier 18 in SYN packet 51 at step 61. Thus, tracking system 10 allows a much earlier recognition of identifier 18 in SYN packet 51.

Referring back to FIG. 1 now, once receiver 31 receives message 12 and cooperates with component 33 to record message 12 in table 37, message 12 is then transmitted by receiver 31 to server A 41.

The subsequent message is transmitted through network 11 in a similar manner. The subsequent message is received by receiver 31. Identifier 18 that is carried by the subsequent message is then compared with previous identifiers stored in table 37. If a match in identifiers is found, receiver 31 directs the subsequent message to the same server that initially processed message 12. Receiver 31 transmits message 12 and the subsequent message unchanged and unmodified to server A 41. The subsequent message and initial message 12 are thus directed to a common point, server A 41. Server A 41 then generates a response to message 12 and the subsequent message. The response generated by server A 41 can therefore be cumulative, i.e., based on information carried by initial message 12 and the subsequent message. For example, if message 12 correlated to the selection of an item offered by server A 41 to be purchased, and the subsequent message correlated to the selection of an additional item to be purchased, server A 41 would generate a response reflecting the aggregation of both selections. The related response would then be sent back to client terminal 13. Any further messages or data generated by a user that relates to initial message 12 would be directed through network 11 in a similar manner. Further responses generated by server A 41 would therefore reflect the accumulation of all information relating to message 12 received by server A 41.

Figure 4:
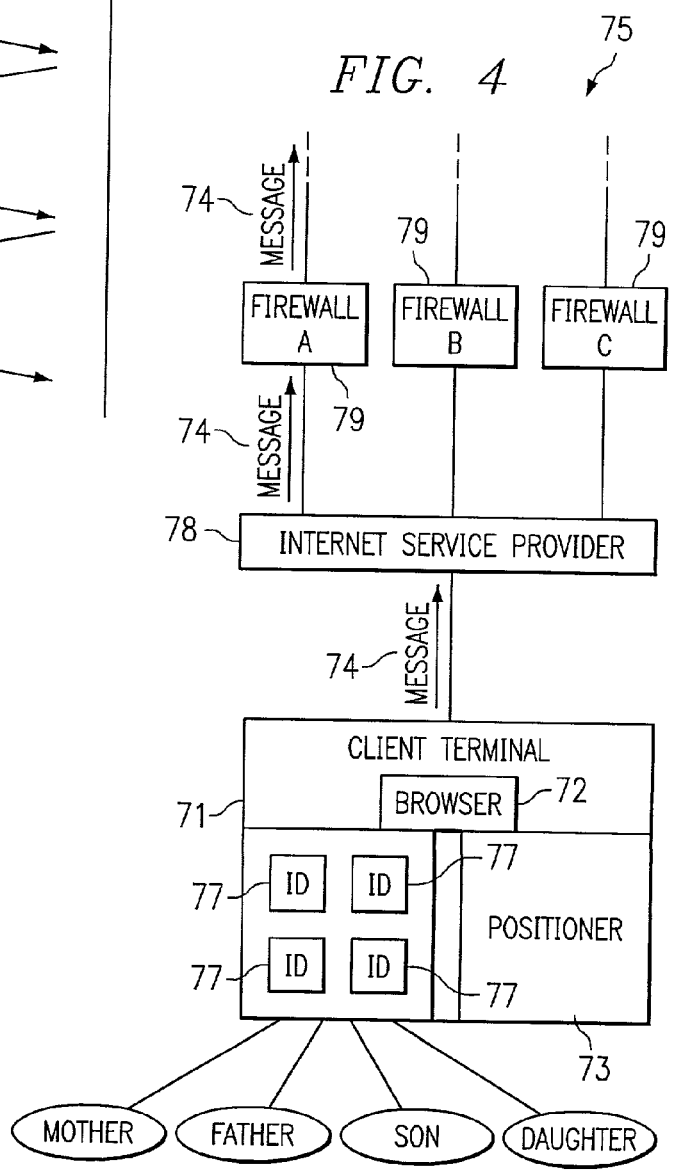
FIG. 4 is a block diagram illustrating an alternative application of the tracking system of FIG.

FIG. 4 illustrates an alternative application of tracking system 10. As illustrated in FIG. 4, a client terminal 71 is provided that includes a browser 72, a positioner 73, and a series of identifiers 77. Client terminal 71 operates in a similar manner to client terminal 13. Client terminal 71 is a commercial component that includes a keyboard, a CPU, and a monitor. A user of client terminal 71 inputs keystrokes which generate an initial message 74. Message 74 requests information from a network 75. Alternatively, message 74 could be any information to be transmitted through network 11. Network 75 in operation is similar to network 11. Network 75 facilitates communication of message 74 through a series of networking components within network 75.

Client terminal 71 also includes a browser 72 and a positioner 73. Browser 72 in operation is similar to browser 17 of FIG. 1. Browser 72 includes conventional software that can send message 74 through network 75. Positioner 73 operates in a similar manner to that of positioner 19. Positioner 73 is software capable of inserting any one of a series of identifiers 77 into initial message 74 and a subsequent message before it is sent through network 75. Alternatively, positioner 73 could be any component, device, or software capable of inserting an identification tool into message 74. The subsequent message carries the same identifier as message 74. The subsequent message is data related to message 74 and generated by client terminal 71, but alternatively could be any information sent through network 75. Positioner 73 inserts one of the series of identifiers 77 into initial message 74 and the subsequent message before they are respectively transmitted through network 75.

Identifiers 77 are globally unique identifiers (GUIDS) in the example embodiment illustrated in FIG. 4, but could alternatively be any identification element capable of distinguishing users of client terminal 71. As illustrated in FIG. 4, identifiers 77 represent a mother, a father, a daughter, and a son respectively. Message 74 can be generated by any one of these users. Message 74 is transmitted with its unique identifier by browser 72 from client terminal 71 to an internet service provider (ISP) 78. ISP 78 in operation is similar to ISP 21. ISP 78 receives initial message 74 and the subsequent message from client terminal 71 and transmits them unchanged to one of a series of firewalls 79. Firewalls 79 are conventional firewalls and are similar to Firewalls A 27, B 28, and C 29 of FIG. 1.

A description will now be provided of the operation of the alternative embodiment illustrated in FIG. 4. In operation, message 74 is generated by one of the users of client terminal 71. Each user is assigned a separate identification element represented by identifiers 77. Each of the identifiers 77 is unique to the user. By inputting keystrokes, a user of client terminal 71 generates message 74. Positioner 73 inserts one of identifiers 77 into message 74. Client terminal 71 then transmits message 74 to ISP 78. ISP 78 then transmits message 74 to any one of firewalls 79. From firewalls 79, message 74 is then transmitted unchanged to its next destination and then throughout network 75 in the same fashion as described above with reference to message 12 in FIG. 1. A related response to message 74 is also generated in the same manner as described above with respect to message 12 of tracking system 10 of FIG. 1.

The subsequent message, which is related to initial message 74, is also generated at client terminal 71 by a user inputting keystrokes. Before the subsequent message is transmitted to ISP 78, positioner 73 inserts a copy of one of identifiers 77 into the subsequent message. Client terminal 71 then transmits the subsequent message to ISP 78. ISP 78 then transmits the subsequent message unchanged to one of firewalls 79. From one of firewalls 79, the subsequent message is then directed to the same server that initially received message 74, in the same fashion as described above with reference to the subsequent message in FIG. 1. A related response to the subsequent message is then generated in the same manner as described above with respect to the subsequent message flowing through tracking system 10 of FIG. 1.

The alternative application therefore, as described with reference to FIG. 4, can limit access to users that may be using the same client terminal. For security reasons or content reasons, it may be preferred that certain individuals within a group of users be restricted from access to information provided by a service provider in network 75. By using multiple identifiers 77, access to information can be based on one of identifiers 77, instead of client terminal 71 as a whole.

For example, because Dad has a unique identifier, Dad could access information such as a bank account provided in network 75, but the unique identifiers associated with a son or daughter would prohibit access to such information. In this sense, the alternative embodiment illustrated in FIG. 4 provides ratings and filtering (R&F) capabilities for the user.

Although one embodiment has been illustrated and described in detail, it should be understood that various substitutions and alterations can be made herein. For example, although tracking system 10 has been described with reference to an internet, other communication systems such as intranets, desktop applications, and wireless communications could utilize tracking system 10 while still realizing the present invention. Other substitutions and alterations are also possible without departing from the spirit and scope of the present invention, as defined by the following claims.

What is claimed is:

1. A method of directing information comprising:
inserting an identifier into a computer-generated message at a client terminal before the message is sent out to a communication network, wherein the identifier remains unchanged during a time interval associated with a transaction related to the message, whereby the message is received at a receiver that includes a component operable to recognize the identifier such that proxying of a connection for the message is avoided at the receiver, wherein the receiver is operable to direct the message to a location in accordance with the identifier, and wherein the receiver and the component cooperate to direct data related to the identifier to the location, wherein the identifier is a globally unique identifier that is maintained within the message for a duration of the transaction, the transaction being a multi-request HTTP transaction.

2. The method according to claim 1, further comprising:
transmitting the data from the location back to a point where the message was initially generated.

3. The method according to claim 2, further comprising:
providing a plurality of servers, each of the servers operable to communicate with the receiver and direct the message and the data to a service provider.

4. The method according to claim 3, further comprising:
storing the identifier and subsequent identifiers in a data table within the receiver, the receiver operable to utilize information within the table to direct the data to one of the plurality of servers, the one of the plurality of servers having initially received the message.

5. The method according to claim 3, further comprising:
completing the transaction, wherein the message and the data cooperate to facilitate completion of the transaction, and wherein the identifier is maintained in a table and the message and the data during the transaction.

6. An apparatus comprising:
a client terminal in a communication network, the client terminal including a positioner operable to insert an identifier into a computer-generated message before the message is sent out to the communication network, wherein the identifier remains unchanged during a time interval associated with a transaction related to the message, whereby a receiver is included within the communication network and operable to receive the message and direct the message to a location in accordance with the identifier, wherein the receiver includes a component operable to recognize the identifier such that proxying of a connection for the message is avoided at the receiver, and wherein the receiver and the component cooperate to direct data that is related to the identifier to the location, wherein the identifier is a globally unique identifier that is maintained within the message for a duration of the transaction, the transaction being a multi-request HTTP transaction.

7. The apparatus according to claim 6, wherein the receiver directs the data that is related to the identifier back to a point where the message was initially generated.

8. The apparatus according to claim 7, wherein the location is one of a plurality of servers and the receiver directs the message to the one of the plurality of servers, and wherein each of the servers is operable to communicate with the receiver and direct the message to a service provider.

9. The apparatus according to claim 8, wherein the component is operable to generate a data table for facilitating identification of the identifier, and wherein when the data is received by the receiver the receiver utilizes the table to direct the data to the one of the plurality of servers.

10. The apparatus according to claim 1, wherein the message includes a synchronize packet that includes a transmission control protocol option, and wherein the globally unique identifier is inserted into the transmission control protocol option of the synchronize packet.

11. The apparatus according to claim 10, wherein a plurality of globally unique identifiers are stored within a data table that facilitates identification of the globally unique identifiers, each of the globally unique identifiers correlating to a respective one of a plurality of messages, and wherein the receiver utilizes the table to direct the data to a server that originally received the one of the plurality of messages, the server being coupled to the receiver.

12. The apparatus according to claim 6, wherein the positioner is coupled to a browser, the browser operable to communicate with an internet service provider, and wherein the internet service provider is operable to communicate with the receiver.

13. The apparatus according to claim 1, wherein the positioner and the receiver operate in one of a Windows-based and Linux environment.

14. The apparatus according to claim 1, wherein the identifier is inserted into an internet protocol address of a computer when the computer is initially activated, the computer being operable to generate the message.

15. An apparatus comprising:
a load balancer for receiving a message that includes an identifier, wherein the message and identifier are generated by a client terminal before the message is sent out to a communication network, and wherein the identifier remains unchanged during a time interval associated with a transaction related to the message whereby when one of a plurality of servers receives the message from the load balancer in accordance with the identifier, the load balancer generates a data table for recording the identifier and wherein, when subsequent data relating to the identifier is received by the load balancer, the load balancer directs the subsequent data to the one of the plurality of servers, the one of the plurality of servers operable to direct the message and the subsequent data to a service provider and redirect associated information transmitted by the service provider to the load balancer which transmits the information back to the client terminal, the identifier being leveraged such that proxying of a connection for the message is avoided, wherein the identifier is a globally unique identifier that is maintained within the message for a duration of the transaction, the transaction being a multi-request HTTP transaction.

16. The apparatus according to claim 15, wherein the message generated by the client terminal is transmitted to an internet service provider.

17. The apparatus according to claim 16, wherein the internet service provider transmits the message to a firewall, the firewall coupled to the load balancer and the internet service provider, and wherein the message and the subsequent data pass through the firewall unaltered.

18. A system for directing information comprising:
means for inserting an identifier into a computer-generated message before the message is sent out to a communication network, wherein the communication network is operable to facilitate communication of the message and wherein the identifier remains unchanged during a time interval associated with a transaction related to the message; and means for receiving the message in the communication network that includes a component operable to recognize the identifier such that proxying of a connection for the message is avoided, wherein the means for receiving is operable to direct the message to a location in accordance with the identifier, and wherein the means for receiving and the component cooperate to direct data that is related to the identifier to the location, wherein the identifier is a globally unique identifier that is maintained within the message for a duration of the transaction, the transaction being a multi-request HTTP transaction.

* * * * *